United States Patent [19]

Brhel

[11] Patent Number: 5,450,142
[45] Date of Patent: Sep. 12, 1995

[54] CONNECTING SYSTEM FOR AN EYEWEAR FRAME

[75] Inventor: Richard L. Brhel, Rochester, N.Y.

[73] Assignee: Bausch & Lomb Incorporated, Rochester, N.Y.

[21] Appl. No.: 115,297

[22] Filed: Sep. 1, 1993

[51] Int. Cl.⁶ ............................................... G02C 5/14
[52] U.S. Cl. ..................................... 351/119; 351/111; 351/118
[58] Field of Search ............... 351/118, 119, 120, 121, 351/111, 158, 116; 2/448

[56] References Cited

U.S. PATENT DOCUMENTS

| | | | |
|---|---|---|---|
| 1,708,205 | 4/1929 | Flodin. | |
| 1,736,954 | 11/1929 | Stevens. | |
| 4,787,728 | 11/1988 | Anger | 351/118 |
| 4,804,260 | 2/1989 | Anger | 351/118 |

FOREIGN PATENT DOCUMENTS

| | | |
|---|---|---|
| 0274563 | 7/1988 | European Pat. Off.. |
| 2384275 | 10/1978 | France. |
| 312111 | 6/1929 | United Kingdom. |
| 665144 | 1/1952 | United Kingdom. |

Primary Examiner—William L. Sikes
Assistant Examiner—Hung Xuan Dang
Attorney, Agent, or Firm—Salvatore P. Pace

[57] ABSTRACT

A connecting system is provided for connecting two components, such as a plastic component to a metal component in an eyewear fram and in particular, in the temple of an eyewear frame. A plastic member with a hollow receiving area for receiving a metal member therein comprises the distal end of the temple. The metal member which is attached to the plastic member on one end and the front frame on the other end has a collar which is slideably mounted around it for attachment to the plastic member. The collar slides with the expansion or contraction of the plastic member to maintain the desired metal to plastic connection interfit.

15 Claims, 3 Drawing Sheets

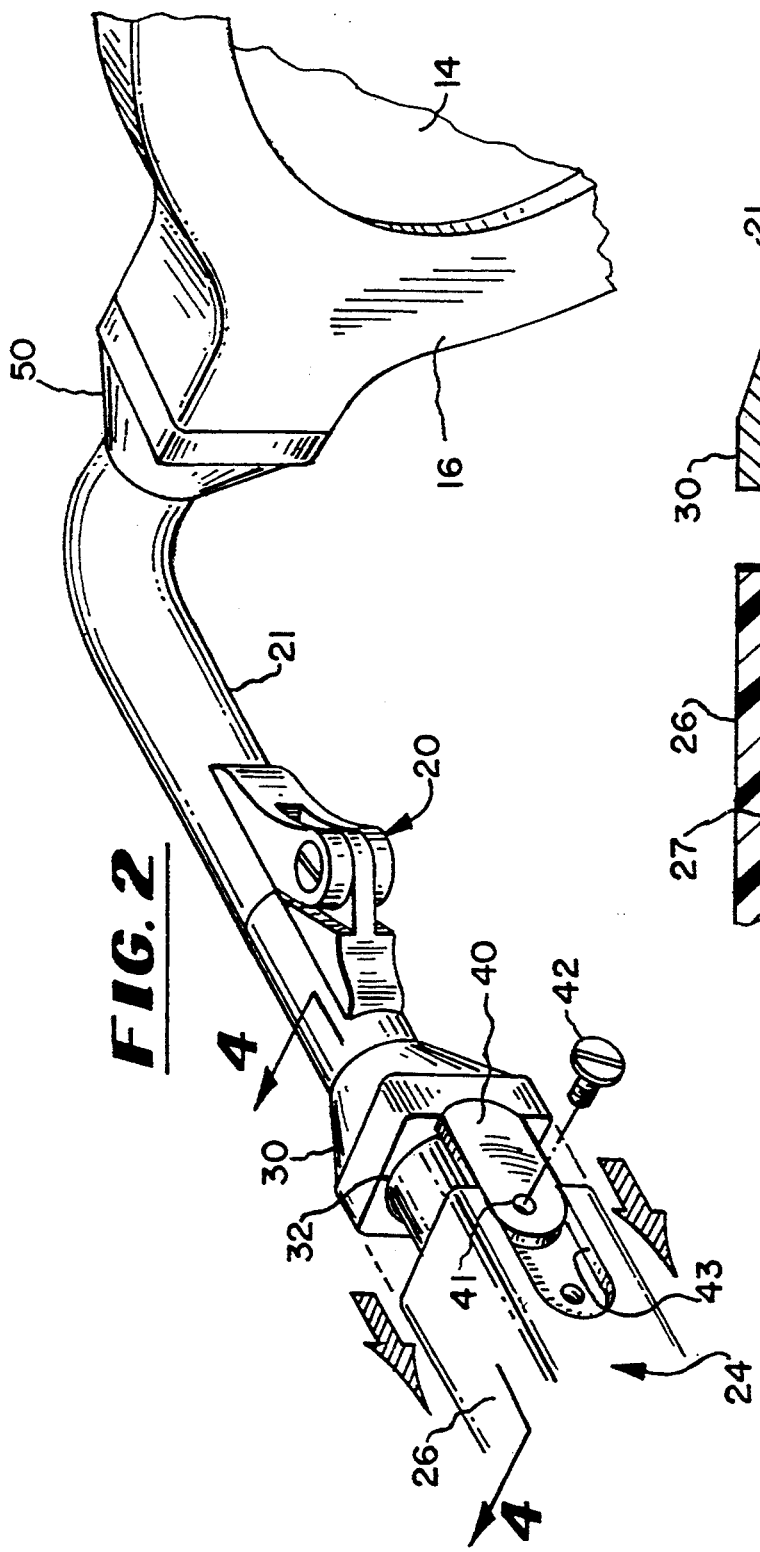

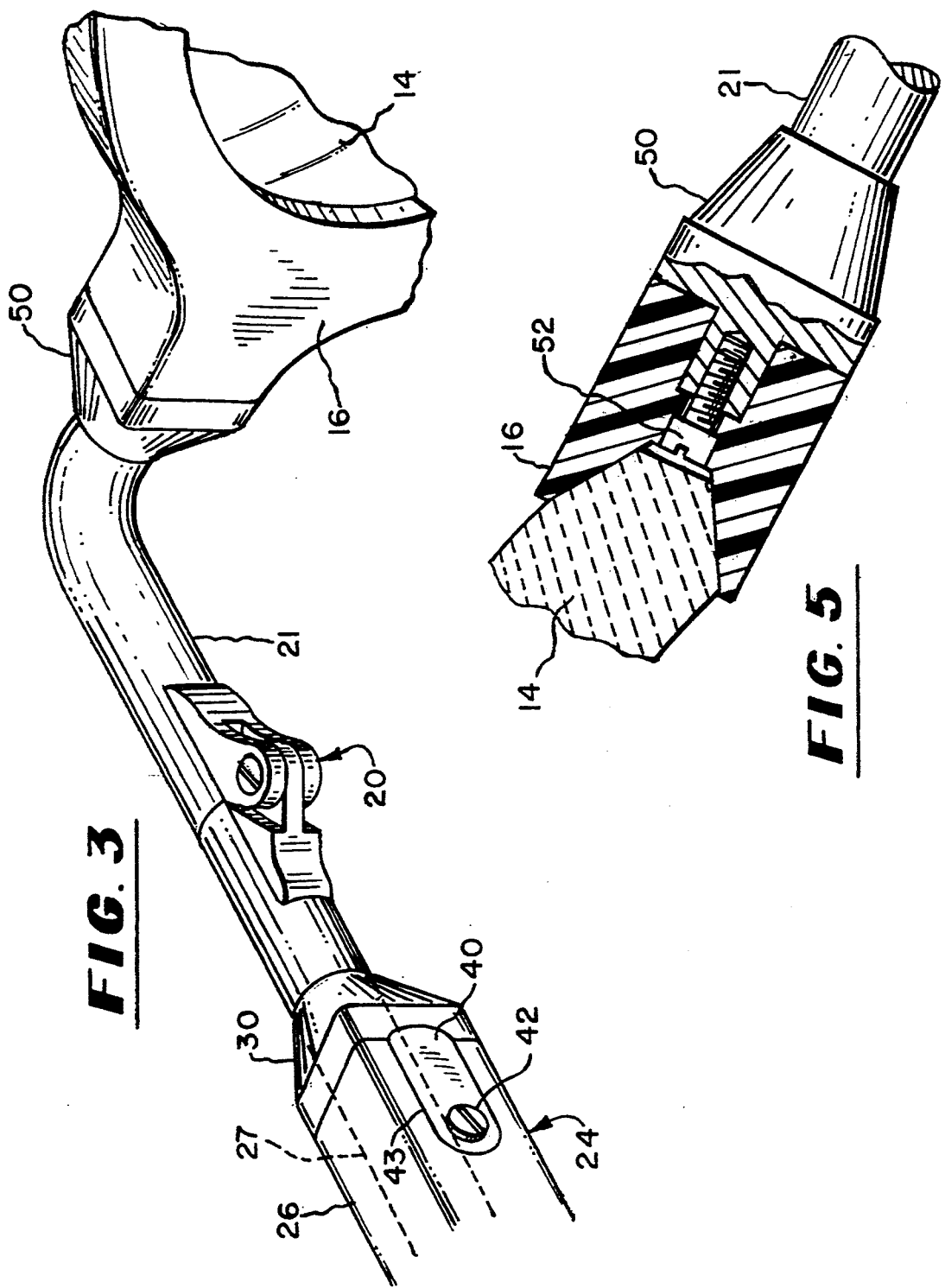

CONNECTING SYSTEM FOR AN EYEWEAR FRAME

BACKGROUND OF THE INVENTION

1. Field of the Invention

The present invention relates to a connection system useful in eyewear frames, and more particularly, relates to a connection system for connecting two components, such as a plastic component and a metal component in the temple of an eyewear frame.

2. Description of the Art

Eyewear, such as sunglasses or spectacles, typically comprise a front frame, temple members which extend out and over the ear of the wearer, and hinge systems for attaching the temples to the front frames. Conventionally, eyewear frames have been made from plastics, such as various acetates, or from metals, such as nickel or copper alloys plated with a precious metal. Plastic frames typically have metal hinges which are attached to the plastic components through simple fastening means such as rivets or by ultrasonic insertion. Usually, the entire temple and front frame are made from one plastic material and only the actual hinge is made from metal.

More recently, eyewear frames have been produced which combine plastic and metal components, or having multiple plastic components, to provide optimal durability, comfort and fashion appeal. Such frames provide for a greater variety of styles and designs allowing them to meet rapidly changing fashion requirements.

However, the connection of components, particularly in temples, has a serious drawback. Since plastic materials contract and expand in various environments, many plastic components have a tendency to change their position with respect to other components. For example, plastic contraction or shrinkage results in the plastic components pulling away from metal components leaving unsightly gaps or spaces. Plastic expansion results in the plastic components pushing against the fixed metal components causing buckling or warping. Moreover, if the expansion or contraction of the plastic components is severe, the plastic and metal components may actually separate causing the frame to disassemble.

While initially this would not seem to be a significant problem, one must consider the typical conditions in which eyewear, particularly sunglasses, are employed. For example, sunglasses left on the dash of an automobile can reach temperatures in excess of 150° F. (66° C.). Although not as severe, sunglasses are also exposed to direct sunlight for several hours at temperatures often between 80° and 100° F. (21° and 38° C.) in normal wearing conditions. Conversely, eyewear worn during winter sporting activities, such as skiing or ice skating, can be exposed to below freezing temperatures for extended periods of time. Thus, it is clear that the method of attaching plastic components to other plastic components or to metal components must be capable of withstanding expansion or contraction of the primary plastic component caused by wide temperature changes without disrupting the plastic to plastic or plastic to metal connection.

To overcome these previous shortfalls, the present invention provides a connecting system wherein the interface between the two components includes a slideable collar which is affixed to the plastic component having the greatest tendency for movement and which can slide along the second component, typically a metal, and slide with the movement of the plastic component during expansion or contraction. This invention can be easily and cost effectively manufactured and provides for a plastic/metal or plastic/plastic interface capable of withstanding various changes in the plastic components due to shifts in temperature while protecting the integrity of the metal to plastic connection and the overall appearance of the eyewear frame.

SUMMARY OF THE INVENTION

The present invention overcomes the problems associated with expansion or contraction of plastic components by providing a connecting system for connecting a plastic member to a second member for use in an eyewear frame. Preferably, the connecting system comprises a plastic temple member having an inner end and an outer end and a hollow receiving area therein beginning at the inner end and running into the plastic member, a metal temple member having a first end for mating within the receiving area and a second end, a collar slideably mounted around the metal member to abut the edge of the inner end for attachment to the front of an eyewear frame, and attachment means for affixing the collar to the plastic member while allowing the movement of the collar on the metal member with the movement of the plastic material.

BRIEF DESCRIPTION OF DRAWINGS

FIG. 2 is a partial left rear perspective view of one temple of the eyewear shown in FIG. 1 showing the collar in the unengaged position;

FIG. 3 is a partial view of the temple shown in FIG. 2 with the collar in an engaged position;

FIG. 4 is a partial cross-sectional side view along lines 4—4 of the temple shown in FIGS. 2; and FIG. 5 is an inside side view of the temple of FIG. 2.

DETAILED DESCRIPTION OF THE INVENTION

Figure 1:
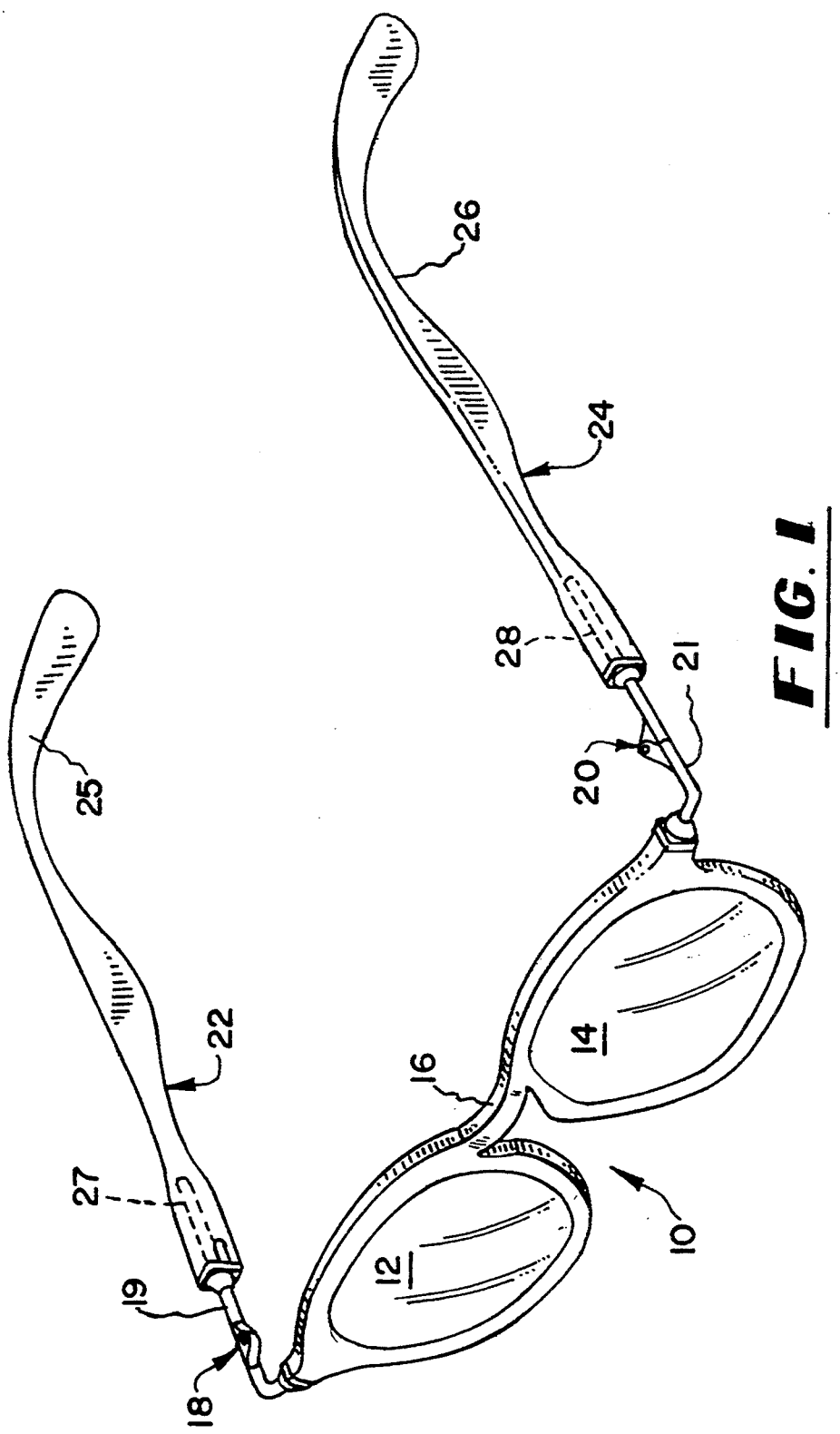
FIG. 1 is a left front perspective view of one embodiment of the present invention showing a dual lens eyewear frame.

Referring to FIG. 1, an eyewear frame 10 is shown having a front frame 16 attached to two lens areas 12 and 14 and temples 22 and 24. Lens areas 12 and 14 are made to incorporate either glass or plastic lenses as is well known. Temples 22 and 24 have plastic members 25 and 26 and metal members 19 and 21, respectively. Metal members 19 and 21 include hinges 18 and 20 as shown. Hinges 18 and 20 are conventional hinges having an interlocking configuration and connected by means of a screw. However, other hinge mechanisms or systems can also be employed.

In this embodiment, temples 22 and 24 comprise both plastic members 25 and 26 and metal members 19 and 21 which are attached using the connecting system of the present invention. It should be noted that the location of the plastic and metal members can vary and are not to be limited by their specific placement in the figures shown. The connecting system can be used on the temple or the front frame. Further, while the invention is principally directed to plastic to metal connections, plastic materials can be employed in place of the metal members 19 and 21. While members 19 and 21 will be referred to herein as metal members, it is understood that plastic materials can be substituted for metal members 25 and 26 and are contemplated as being within the scope of this invention.

Referring also now to FIGS. 2, 3 and 4, part of temple 24 is shown having the connecting system of the present invention. FIG. 2 shows the section of temple 24 having hinge 20, the connecting system with the collar 30 in an unengaged position and the connection of metal member 21 to the edge of front frame 16. FIG. 3 shows the same view as FIG. 2 except the collar 30 is in the engaged position. FIG. 4 is a partial cross-sectional side view of the connecting system section of temple 24 shown along lines 4—4 to illustrate the relationship of collar 30, metal member 21 and plastic member 26. The description herein of temple 24 will also describe corresponding temple 22 as is understood by one skilled in the art.

Metal member 21 including hinge 20 has a first or temple end which is inserted into receiving area 27 of plastic member 26. Receiving area 27 is a recess running from the inner end or attachment end of plastic member 26 to a point within plastic member 26. The second end or front end of metal member 21 is attached to front frame 16. Metal member 21 thereby extends from inside plastic member 26 to front frame 16. The second end of metal member 21 can be attached directly to front frame 16 or to lens area 14 by any suitable connecting means. The second end of metal member 21 is described below.

Collar 30 is placed around metal member 21 prior to insertion of the first end of metal member 21 into plastic member 26. As best shown in FIG. 4, collar 30 has opening 32 which can slide along metal member 21. The opening of collar 30 will preferably have the same configuration or shape as the exterior of metal member 21 but will be slightly larger to facilitate movement. Collar 30 will preferably have a shape which matches the exterior shape of plastic member 26. In this manner, the interface between collar 30 and the front edge of plastic member 26 will be smooth and stylistic.

In FIG. 3, metal member 21 including hinge 20 is shown inserted into receiving area 27 of plastic member 26. Collar 30 is slideable mounted around metal member 21 and is affixed to connecting plate 40. Connecting plate 40 has an opening 41 for placing a conventional fastening means there through to attached collar 30 to plastic component 26. While connecting plate 40 can be attached to collar 30 through any conventional fastening means, preferably, it is either integrally formed with collar 30 or permanently affixed to collar 30 by brazing, welding or other mechanical fastening means. Collar 30 is attached to plastic member 26 by a mechanical fastening means, such as screw 42 positioned through opening 41, which will hold collar 30 securely against the interface edge of plastic member 26. Plastic member 26 preferably has slot 43 on its inside side which conforms to the shape of connecting plate 40 and can receive connecting plate 40 therein. In this manner, connecting plate 40 fits into slot 43 to provide an interfit which results in a smooth surface finish and a secure connection.

It is important that collars 30 and 31 be attached to metal members 19 and 21, respectively in a manner which will allow collars 30 and 31 to remain slideable on metal members 19 and 21 and flow with the movement of plastic members 25 and 26. Collars 30 and 31 thereby move with the contraction or expansion of plastic members 25 and 26 in order to maintain a flush connection between collars 30 and 31 and the interface edge of plastic members 25 and 26.

In a separate embodiment, not shown, collars 30 and 31 can be manufactured in the absence of a connecting plate 40 and affixed to the edge of plastic members 25 and 26 through a suitable adhesive or other attachment vehicle.

FIG. 5 shows the attachment of metal member 21 to front frame 16 through lens area 14. Preferably, as shown in FIG. 5, the second end of metal member 21 is inserted into an opening within front frame 16 so as to permit a fastener to be located in lens area 14 through front frame 16 and into metal member 21. Screw 52 can be employed for this purpose although other fastening means can also be employed. Collar 50 can also be employed in a manner as described above for collars 30 and 31. Preferably, collar 50 will not have a connecting plate and will be affixed to front frame 16 with a suitable adhesive or to metal member 21 by brazing or the like.

When manufacturing the eyewear frame of the present invention, it is preferred that the shape of the portion of metal members 19 and 21 within plastic members 25 and 26 be configured to prevent axial rotation of plastic members 25 and 26. This is most easily achieved by modifying this portion of metal members 19 and 21 so as not to have a circular exterior configuration. Other modifications can be used to prevent such rotation.

The present invention is not to be limited by the figures set forth herein or the embodiments specifically disclosed therein. It should be understood that the scope of this invention includes all modifications, variations and equivalents which fall within the scope of the attached claims.

What is claimed:

1. A connecting system for connecting a plastic member to a second member for use in an eyewear frame comprising a plastic member having an inner end and an outer end and a hollow receiving area therein beginning at said inner end and running into said plastic member, a second member having a temple end for mating within said receiving area and a front end, a collar slideably mounted around said second member to abut the edge of said inner end, and attachment means for affixing said collar to said plastic member while allowing the free movement of said collar on said second member with the movement of said plastic member.

2. The eyewear frame of claim 1 wherein said second member is metal.

3. The eyewear frame of claim 1 wherein said attachment means comprises a connecting plate extending from said collar over an outer surface of said inner end and means for attaching said connecting plate to said plastic member.

4. The eyewear frame of claim 3 wherein said means for attaching said connecting plate to said plastic member is a screw.

5. The connecting system of claim 4 wherein said front end of said second member is attached to the front of an eyewear frame.

6. The connecting means of claim 5 wherein said front end is inserted into an opening within said front.

7. An eyewear frame comprising a front frame and a pair of rearwardly extending temples attached on opposite ends of said front frame wherein said temple comprises a plastic member having an inner end and an outer end and a hollow receiving area therein beginning at said inner end and running into said plastic member, a metal member having a first end for mating with said receiving area and a second end for attachment to said front frame, a collar slideably mounted around said metal member and abutting the edge of said inner end, and attachment means for affixing said collar to said plastic member.

8. The eyewear frame of claim 7 wherein said attachment means permits the movement of said collar along said metal member with the movement of said plastic member.

9. The eyewear frame of claim 8 wherein said receiving area continues through said plastic member to a point near said outer end.

10. The eyewear frame of claim 9 wherein the portion of said first end within said receiving area of said plastic member be configured to prevent axial rotation of said plastic member.

11. In an eyewear frame having a front frame and a pair of outwardly extending temples, the improvement comprising wherein said temple comprises a plastic member and a metal member, said plastic member comprises an inner end for attachment to said metal member, an outer end at the point most distal from said front frame, and a hollow receiving area running from said inner end to a point within said plastic member, and said metal member comprises a first end for mating within said receiving area of said plastic member. a second end for attachment to said front frame, and a collar slideably mounted around said metal member attached to said inner end.

12. The eyewear frame of claim 11 wherein said collar freely slides along said metal member during the expansion or contraction of said plastic member.

13. The eyewear frame of claim 12 wherein said collar is attached to said inner end by an adhesive.

14. The eyewear frame of claim 12 wherein said collar is attached to said inner end by a fastener.

15. A temple assembly for an eyewear frame comprising a plastic member having an inner end and an outer end and a hollow receiving area therein beginning at said inner end and running into said plastic member, a metal member having a first end for mating within said receiving area and a second end, a collar slideably mounted around said metal member to abut the edge of said inner end, and a connecting plate running from said collar to a said plastic member, said connecting plate affixed to said plastic member by a fastener, thereby allowing the free movement of said collar along said metal member with the movement of said plastic member.

* * * * *